United States Patent [19]

Tsuchiya

[11] Patent Number: 4,554,603

[45] Date of Patent: Nov. 19, 1985

[54] ADAPTER FOR A MINIATURE TYPE TAPE CASSETTE

[75] Inventor: Eiichi Tsuchiya, Yokohama, Japan

[73] Assignee: Victor Company of Japan, Ltd., Yokohama, Japan

[21] Appl. No.: 516,806

[22] Filed: Jul. 25, 1983

[30] Foreign Application Priority Data

Jul. 30, 1982 [JP] Japan ............................... 57-134271
Jul. 30, 1982 [JP] Japan ........................... 57-116936[U]
Jul. 30, 1982 [JP] Japan ........................... 57-116938[U]

[51] Int. Cl.$^4$ ............................................ G11B 15/66
[52] U.S. Cl. ........................................ 360/94; 360/93; 360/85; 360/96.5; 360/132; 242/199
[58] Field of Search ..................... 360/132, 85, 94, 93, 360/96.5; 242/199, 198

[56] References Cited

U.S. PATENT DOCUMENTS 4,452,407  1/1984  Ogata et al. .......................... 242/198
4,470,560  9/1984  Yoneya et al. ....................... 242/199
4,477,850 10/1984  Ogata et al. ............................ 360/94
4,494,161  1/1985  Ogata et al. .......................... 360/132

Primary Examiner—Stuart N. Hecker
Assistant Examiner—Alfonso Garcia
Attorney, Agent, or Firm—Louis Bernat

[57] ABSTRACT

An adapter for a miniature type tape cassette has an external form and size smaller than those of a standard type tape cassette. The adapter comprises an adapter case having an external form and size substantially identical to those of the standard type tape cassette, an accommodating part for accommodating the miniature type tape cassette, a cover provided in a state free to open and close for covering the accommodating part in its closed state, a tape draw-out mechanism provided within the adapter case, for drawing out a tape from the miniature type tape cassette accommodated within the accommodating part and forming a predetermined tape path within the adapter case, and a locking mechanism for engaging with a part of the tape draw-out mechanism when the cover is in its open state, and for locking the tape draw-out mechanism in an immovable state at a position before the tape draw-out mechanism starts a tape draw-out operation. The locking mechanism is displaced by one part of the cover and disengages from the part of the tape draw-out mechanism when the cover is closed to release the locking with respect to the tape draw-out mechanism.

6 Claims, 22 Drawing Figures

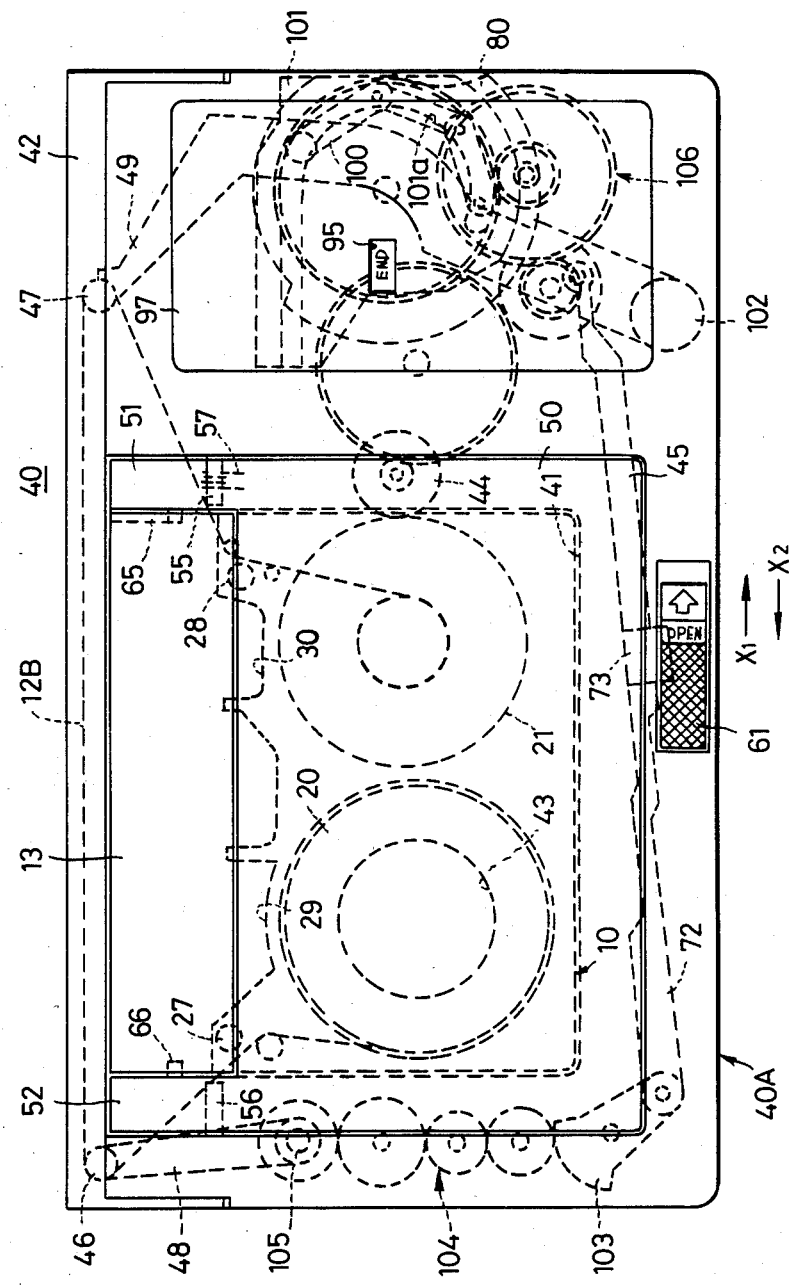

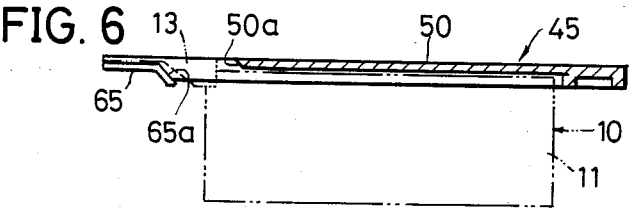
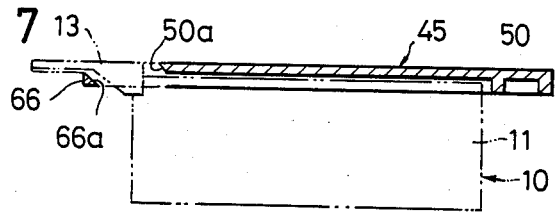
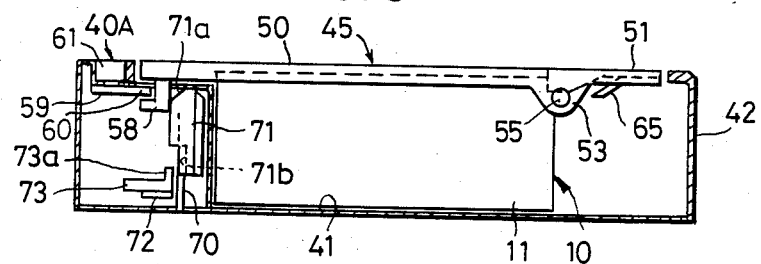
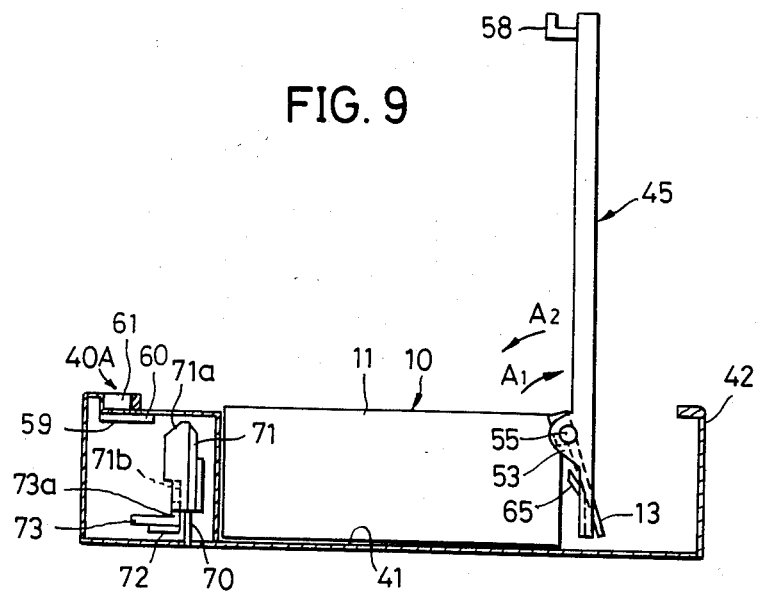

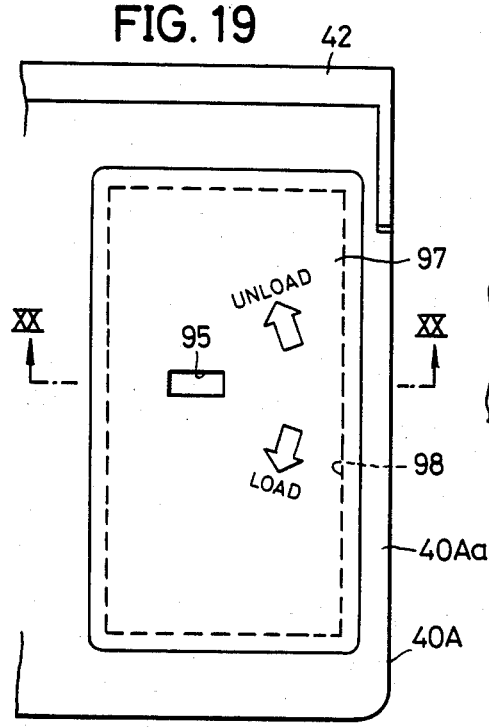
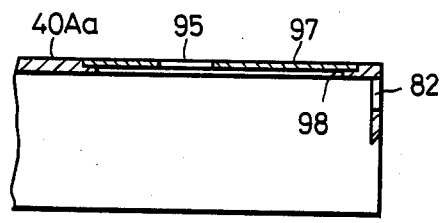
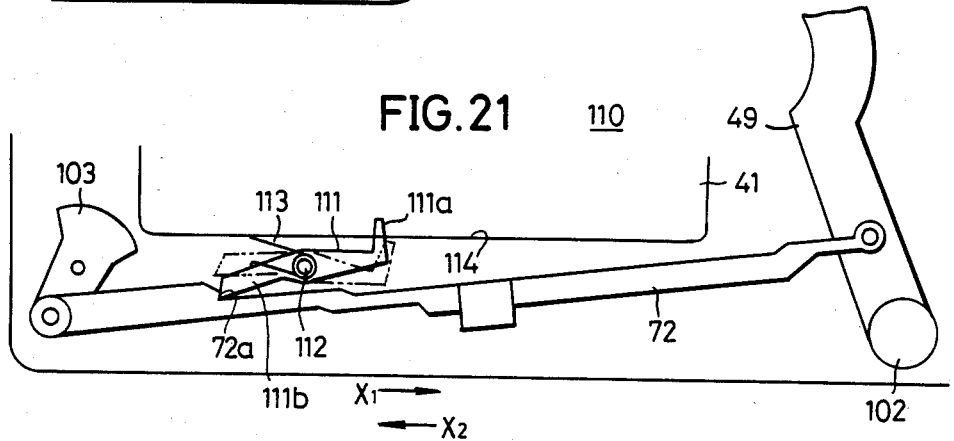
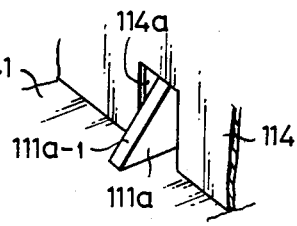

ADAPTER FOR A MINIATURE TYPE TAPE CASSETTE

BACKGROUND OF THE INVENTION

The present invention generally relates to adapters for miniature type tape cassettes which are smaller than type tape cassettes, which adapters each accommodate therein a miniature type tape cassette and are loaded into and used with standard type recording and/or reproducing apparatuses. The present invention more particularly relates to an adapter for a miniature type tape cassette, which adapter comprises means for drawing a tape out of the miniature type tape cassette which is accommodated within the adapter and forming a predetermined tape path within an adapter case.

Presently, video signal recording and/or reproducing apparatuses using tape cassettes are reduced to practical use on the world-wide basis. As types of these recording and/or reproducing apparatuses using tape cassettes, two or three standardized types of apparatuses presently exist world-widely. There is no interchangeability between apparatuses of different standards, however, the interchangeability exists between apparatuses adopting the same standard. Accordingly, a tape cassette recorded by one recording and/or reproducing apparatus can be reproduced by another recording and/or reproducing apparatus of the same standard. Hence, in order to ensure the interchangeability between different recording and/or reproducing apparatuses manufactured by different manufacturers so as to perform recording and/or reproduction, a standardization is established with respect to formats of the tape cassette and the recording and/or reproducing apparatus. That is, the above formats are standardized for each standard, and a standard type tape cassette and a standard type recording and/or reproducing apparatus are respectively manufactured and marketed under each standard.

Recently, a problem of much importance involves the realization in downsizing the recording and/or reproducing apparatus main body. This is to develop a more compact portable type recording and/or reproducing apparatus, and, for example, to realize such an equipment that a recording apparatus is unitarily built into a television camera.

Accordingly, in order to downsize the recording and/or reproducing apparatus without changing the formats of the tape cassette and the recording and/or reproducing apparatus, a miniature type tape cassette was proposed in a U.S. patent application Ser. No. 322,174 now abandoned entitled "MINIATURE TYPE TAPE CASSETTE" filed Nov. 17, 1981 in which the assignee is the same as that of the present application. This type of a miniature type tape cassette was also proposed in U.S. patent application Ser. No. 340,106 now U.S. Pat. No. 4,476,505 filed Jan. 18, 1982 and Ser. No. 392,157 now U.S. Pat. No. 4,504,876 filed June 25, 1982, in which the assignee is also the same as that of the present application. The proposed miniature tape cassette has a size smaller than the standard type tape cassette, and is loaded independently into a recording and/or reproducing apparatus of a type different from the standard type recording and/or reproducing apparatus which carried out recording and reproduction when loaded with the standard type tape cassette.

Further, an adapter for a miniature type tape cassette was proposed in a U.S. patent application Ser. No. 322,767 entitled "ADAPTER FOR A MINIATURE TYPE TAPE CASSETTE" filed Nov. 19, 1981 in which the assignee is the same as that of the present application. This type of an adapter was also proposed in U.S. patent application Ser. No. 340,105 now U.S. Pat. No. 4,477,850 filed Jan. 18, 1982, Ser. No. 340,097 now abandoned filed Jan. 18, 1982, and Ser. No. 473,854 filed Mar. 9, 1983, in which the assignee is also the same as that of the present application. The proposed adapter has an external form and size identical to the standard type tape cassette. This proposed adapter is designed so as to accommodate the miniature type tape cassette therein, and is loaded into the standard type recording and/or reproducing apparatus in a state where a tape is drawn out of a cassette case of the miniature type tape cassette to form a predetermined tape path within the adapter.

In addition, an improved version of the above proposed adapter was proposed in a U.S. patent application Ser. No. 495,808 entitled "ADAPTER FOR A MINIATURE TYPE TAPE CASSETTE" filed May 18, 1983.

According to this improved version of the proposed adapter, a tape draw-out mechanism for drawing the tape out of the cassette and forming a predetermined tape path within the adapter, is operative even when a top cover which covers the accommodated miniature type tape cassette is open. Moreover, the top cover can be opened even before all of the tape forming the predetermined tape path is recovered within the cassette, which means that it is possible to remove the accommodated cassette from the adapter in this state. Accordingly, when the top cover of the adapter is open and the cassette is simply accommodated within the adapter with the front lid of the cassette still closed, and an attempt is made to draw the tape out of the accommodated cassette in this state, the tape and the tape draw-out mechanism may become damaged. Further, when the tape is drawn out of the cassette or the tape is not completely recovered within the cassette, and the top cover of the adapter is opened in this state, the accommodated cassette may be erroneously removed from the adapter. In this case, the tape will become damaged by such an erroneous removal of the accommodated cassette.

Moreover, the tape draw-out mechanism is operative even in a state where a cassette is not accommodated within the adapter. Thus, if the user erroneously leaves this tape draw-out mechanism in a state operated halfway, it will be impossible to accommodate the cassette within this adapter because poles of the tape draw-out mechanism will interfere. If an attempt is made to forcibly accommodate the cassette within this adapter, the tape or the cassette case may become damaged.

SUMMARY OF THE INVENTION

Accordingly, it is a general object of the present invention to provide a novel and useful adapter for a miniature type tape cassette, in which the above described problems have been eliminated.

Another and more specific object of the present invention is to provide an adapter for a miniature type tape cassette, which is designed so that a tape draw-out mechanism for drawing out the tape from the cassette and forming a predetermined tape path within the adapter is locked so as not to operate when a top cover of the adapter is open. Locking of the tape draw-out mechanism by means for locking the tape draw-out mechanism in a state before a tape draw-out operation is started, is released by closing the top cover of the adapter. According to the adapter of the invention, the tape will not be drawn out of the cassette unnecessarily in a state where the top cover of the adapter is open, that is, in a state where accommodation of the cassette within the adater has not been completed.

Still another object of the present invention is to provide an adapter for a miniature type tape cassette, which designed so that the top cover of the adapter will not open unless the tape draw-out mechanism for drawing the tape out of the cassette and forming the predetermined tape path within the adapter and also recovering the drawn out tape within the cassette, assumes a state where all of the drawn out tape has been recovered within the cassette. According to the adapter of the present invention, the accommodated cassette is prevented from being erroneously removed from the adapter in a state where the tape is drawn out of the cassette and is within the adapter. Thus, the tape is prevented from being damaged by such erroneous removal of the cassette from the adapter.

Another object of the present invention is to provide an adapter for a miniature type tape cassette, which is designed so that the tape draw-out mechanism will not operate in a state where the cassette is not accommodated within the adapter. According to the adapter of the present invention, the accommodation of the cassette within the adapter will not be carried out in a state where the tape draw-out mechanism is not in its state before starting a tape draw-out operation, that is, in its state after completion of the tape draw-out operation. Accordingly, it is possible to prevent accidental damage to the tape, cassette case, and the like which will occur if an attempt is made to accommodate the cassette within the adapter in a state where the tape draw-out mechanism is not in its state before starting or after completion of the tape draw-out operation.

Other objects and further features of the present invention will be apparent from the following detailed description when read in conjunction with the accompanying drawings.

BRIEF DESCRIPTION OF THE DRAWINGS

FIG. 3 is a plan view showing the adapter shown in FIG. 2 in a state after completion of the tape draw-out operation;

FIGS. 6 and 7 are views in vertical cross section respectively showing a top cover locking part along lines VI—VI and VII—VII in FIG. 4, in correspondence with the miniature type tape cassette;

FIGS. 8 and 9 are side views showing states of a locking mechanism with respect to a front lid of the miniature type tape cassette and a tape loading mechanism, in a state where the top cover is closed and a state where the top cover is open, respectively;

FIG. 19 is a plan view showing an indication panel part;

FIG. 20 is a view in vertical cross section along a line XX—XX in FIG. 19;

FIG. 21 is a plan view showing an essential part of another embodiment of an adapter according to the present invention; and FIG. 22 is a perspective view showing a finger for detecting accommodation of a cassette in the adapter shown in FIG. 21.

DETAILED DESCRIPTION

Figure 1:
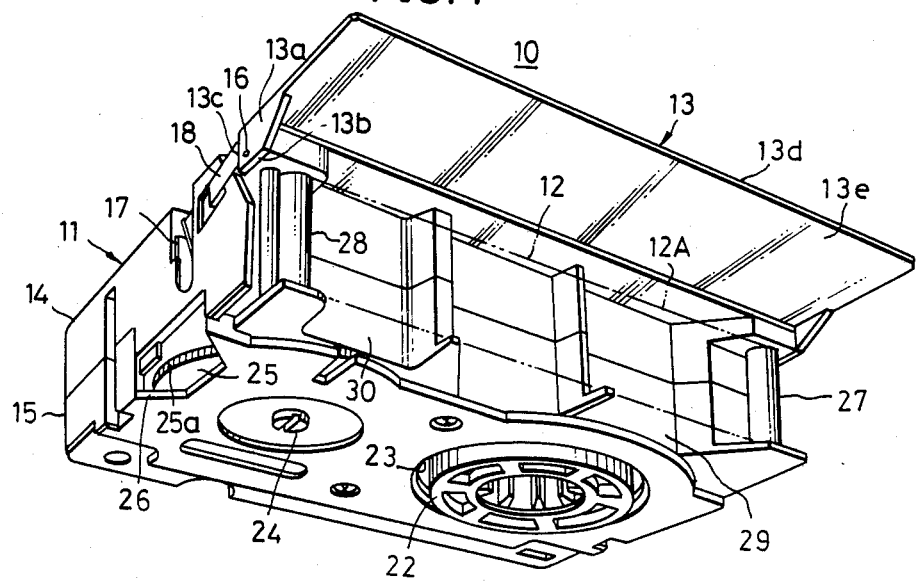
FIG. 1 is a perspective view showing an example miniature type tape cassette which is accommodated within an adapter according to the present invention, viewed from a lower front thereof in a state where a front lid of the cassette is open.

An example of a miniature type tape cassette which is accommodated within an adapter according to the present invention, is shown in FIG. 1. A miniature type tape cassette 10 has a cassette case 11 of a size smaller than a standard type tape cassette which is designed for a standard type recording and/or reproducing apparatus. A tape protecting front lid 13 for protecting a magnetic tape 12 accommodated within the tape cassette 10, is provided on the front of the cassette case 11. In FIG. 1, the magnetic tape 12 is indicated by a two-dot chain line. The cassette case 11 consists of an upper half 14 and a lower half 15.

Side flanges 13a are integrally formed on both ends of the lid 13, and respective portions of the flanges are axially supported by corresponding hinge pins 16 (only one shown) in the vicinity of respective corner parts of the upper half 14, so that the lid 13 is rotatable to open and close. A substantially U-shaped leaf spring 17 and a slide rod 18 which is urged towards one of the hinge pins 16 by the leaf spring 17, are provided in relation to the lid 13. The lid 13 is angularly rotatable about the hinge pins 16, and can assume two states. That is, in one state, one side edge 13b of the side flange 13a is pushed by the slide rod 18 and the lid 13 is in a closed state, and in another state, another side edge 13c of the side flange 13a is pushed by the slide rod 18 and the lid 13 is in an open state shown in FIG. 1. When the tape cassette 10 is not loaded into a recording and/or reproducing apparatus which will be described hereinafter designed exclusively for the tape cassette 10 or accommodated within a tape cassette adapter, the lid 13 covers the front of the cassette case 11 to protect the magnetic tape 12 which is exposed at the front of the cassette case 11.

Figure 2:
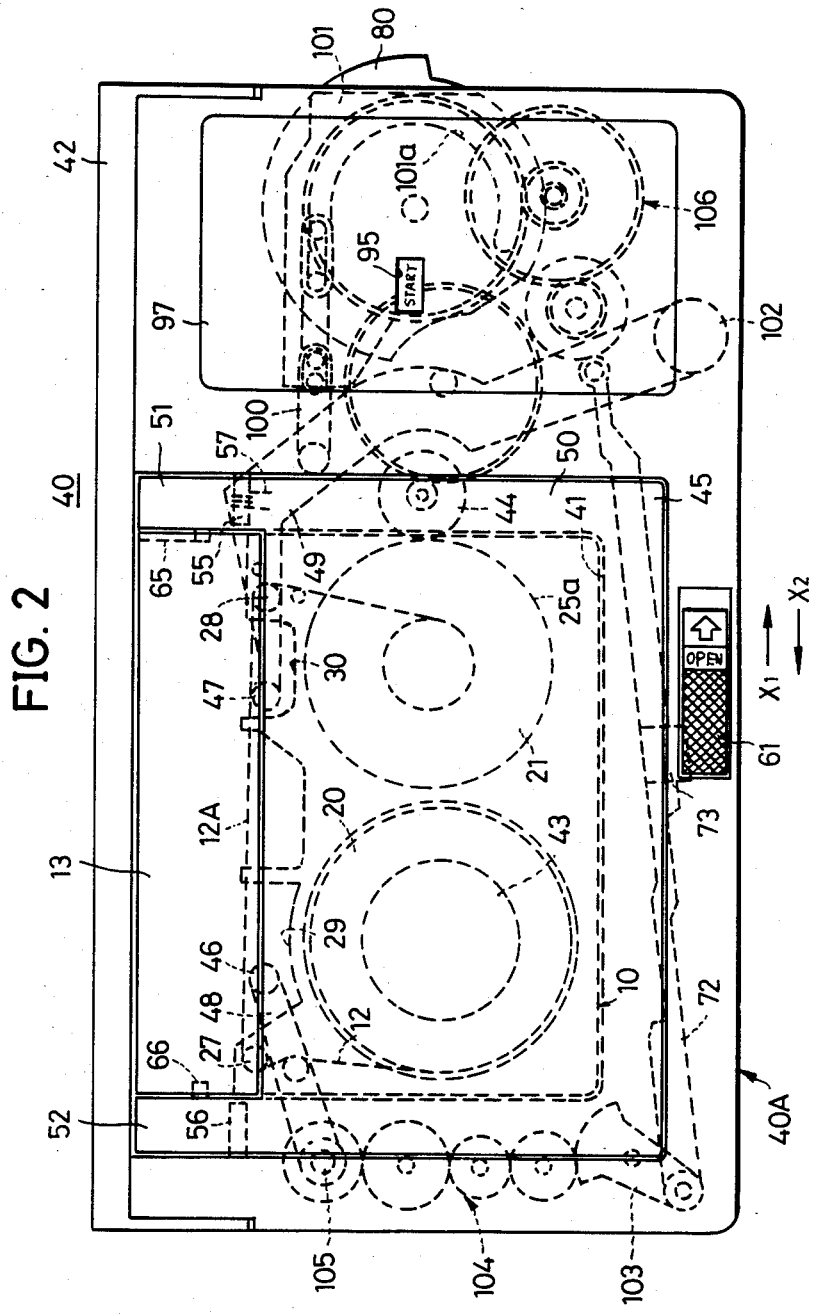
FIG. 2 is a plan view showing an adapter according to the present invention in a state before a tape draw-out operation is started or after completion of a tape draw-out operation.

In addition, a supply reel 20 and a take-up reel 21 are provided side by side within the cassette case 11 as shown in FIG. 2. The supply reel 20 is provided in a state where an annular projecting step portion 22 of a lower flange is loosely fitted into a hole 23 having a large diameter in the lower half 15. The take-up reel 21 is provided in a rotatable manner in such a manner that a fixed shaft embedded in the lower half 15 by a screw 24, is inserted into a center hole of a reel hub. A part of a gear 25a formed at the periphery of a lower flange 25 of the take-up reel 21, is exposed through a cutout window 26 provided in the lower half 15. The tape 12 is guided by poles 27 and 28, for forming a tape path 12A along the front of the cassette case 11.

Next, description will be given with respect to an embodiment of the adapter for a miniature type tape cassette according to the present invention, for a case where the adapter is loaded into the standard type recording and/or reproducing apparatus in a state accommodating the tape cassette 10 having the above described construction.

As shown in FIG. 2, an adapter 40 has an accommodating part 41 for accommodating the tape cassette 10 within an adapter case 40A. The adapter case 40A has an external form and size substantially equal to those of the standard type tape cassette. A front lid 42 is free to open and close, and is provided at the front of the adapter case 40A. As will be described hereinafter, the lid 42 protects the tape 12 which forms a predetermined tape path within the adapter 40.

The accommodating part 41 is formed as a depression having an opening at the upper part thereof. A reel driving shaft inserting hole 43 is provided on the bottom part of the accommodating part 41. Furthermore, a reel driving gear 44 partly projects into the accommodating part 41 from a side thereof. The opening at the upper part of the accommodating part 41 is covered by a top cover 45 which may be opened or closed.

Poles (or rollers) 46 and 47 for drawing out and guiding the tape are respectively embedded at the ends of a first loading arm 48 and a second loading arm 49. These poles 46 and 47 move between positions indicated in FIG. 2 before the tape is drawn out, and positions indicated in FIG. 3 after the operation of drawing out the tape is completed. Before the tape is drawn out, the poles 46 and 47 are positioned within the accommodating part 41, and assume positions opposing cutouts 29 and 30 of the tape cassette 10 which is accommodated within the adapter 40, as shown in FIG. 2. After the operation of drawing out the tape is completed, the poles 47 and 46 respectively assume positions corresponding to positions of right and left tape guide poles provided at the front of the standard type tape cassette, to guide the tape, as shown in FIG. 3. The poles 46 and 47 simultaneously move between the above two positions, by rotationally manipulating a rotary manipulation knob 80 provided at the right side of the adapter case 40A by the operator's finger tips, as will be described hereinafter.

Figure 4:
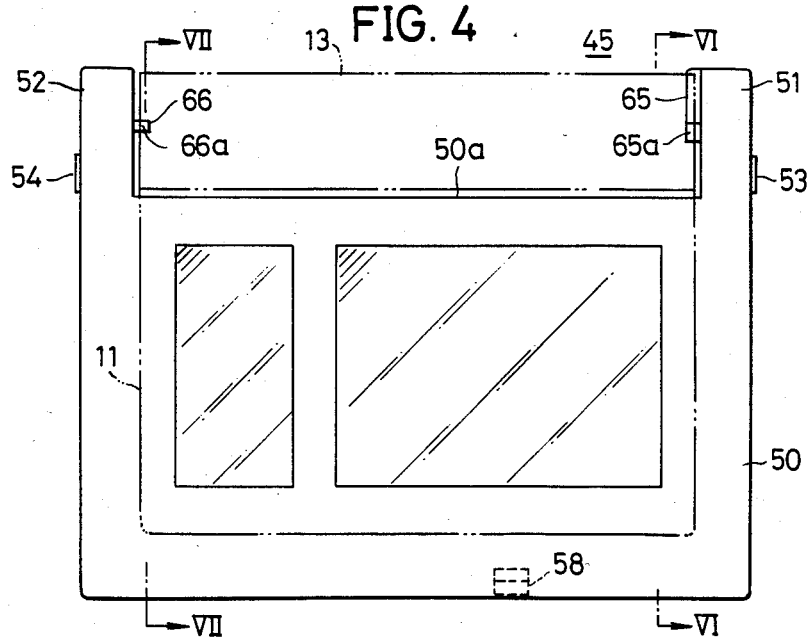
FIGS. 4 and 5 are a plan view and an elevation respectively showing a top cover of the adapter.
Figure 5:
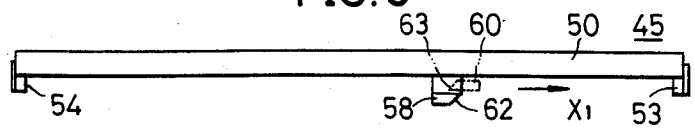

As shown in FIGS. 4 and 5, the top cover 45 comprises a main body 50, and right and left arms 51 and 52 integrally extending from the front of the main body 50. Bearings 53 and 54 are provided at the bases of the respective arms 51 and 52, and pins 55 and 56 of the adapter case 40A are supported by these bearings 53 and 54. Accordingly, the cover 45 is rotatable between a closed position shown in FIG. 8 where the top of the accommodating part 41 is covered by the cover 45, and an open position shown in FIG. 9 where the cover 45 extends vertically. The cover 45 is urged to open by a torsion coil spring 57 shown in FIG. 2. Further, an L-shaped hook 58 of the cover 45 is normally locked by a locking finger 60 of a sliding member 59 (refer to FIGS. 5, 8, and 11), and the cover 45 is locked in its closed position.

When a sliding knob 61 at the upper surface of the adapter case 40A slides in the direction of an arrow X1, the locking finger 60 disengages from the hook 58 to release the locking. Hence, the cover 45 is rotated in the direction of an arrow A1 to its vertical position due to the action of the torsion coil spring 57, and the cover 45 is automatically opened when the sliding knob 61 is slid in the direction of the arrow X1. On the other hand, when the cover 45 is rotated in the direction of an arrow A2, a sloping surface 62 of the hook 58 hits a sloping surface 63 of the locking finger 60. Accordingly, the locking finger 60 is once pushed in the direction of the arrow X1 as the cover 45 closes, and then moves back in the direction of an arrow X2 when the cover 45 is completely closed, so as to lock the cover 45 in its closed state, as shown in FIGS. 5 and 8.

Figure 11:
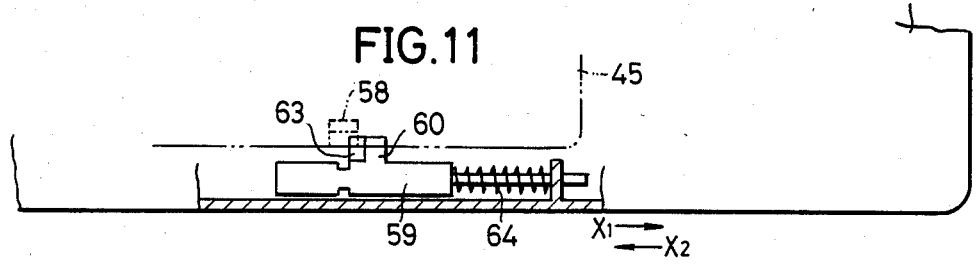
FIG. 11 is a plan view showing a mechanism for locking the top cover in a closed position.
Figure 12:
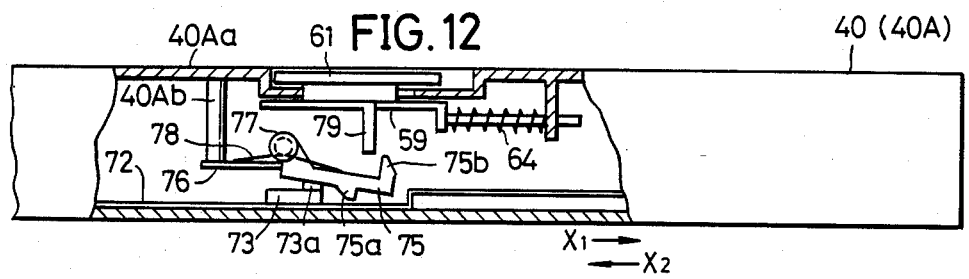
FIGS. 12 and 13 are elevations, with a part cut away, showing a mechanism for locking a sliding knob in a state before a tape loading operation is started and a state after a tape loading operation is completed, respectively.

As shown in FIGS. 11 and 12, the sliding knob 61 is integrally mounted on the sliding member 59. The sliding knob 61 is provided slidable on a top plate 40Aa of the adapter case 40A, and is urged in the direction of the arrow X2 by a compressed coil spring 64.

In addition, as shown in FIGS. 6 and 7, mutually opposing lid locking parts 65 and 66 are integrally formed on the inner sides of the arms 51 and 52 of the cover 45. As shown in FIG. 6, the lid locking part 65 has a sloping surface 65a which slopes downwardly at one end thereof towards the main body 50 and projects from the back surface of the main body 50. On the other hand, as shown in FIG. 7, the other lid locking part 66 has a sloping surface 66a which slopes downwardly towards the main body 50, and has a shape of a triangular prism. The lid locking parts 65 and 66 are formed below the upper surface of the arms 51 and 52, by a distance corresponding to the thickness of the lid 13 of the tape cassette 10. As will be described hereinafter, the lid locking parts 65 and 66 automatically opens the lid 13 of the tape cassette 10 and holds the lid 13 in its open state as the cover 45 is closed.

The cover 45 is designed so that a locking mechanism with respect to the tape loading mechanism is controlled according to the opening and closing of the cover 45. Description on this control will be given hereinafter.

Figure 14:
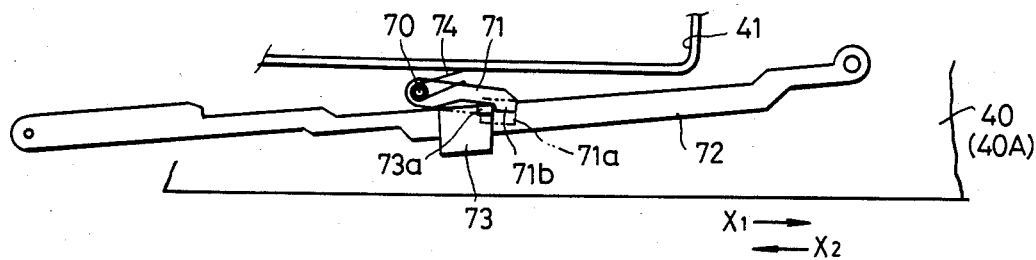
FIG. 14 is a plan view showing a state of the locking mechanism with respect to the tape loading mechanism when the top cover is open.

A locking mechanism with respect to the tape loading mechanism, is constituted by a stopper 71 supported by a vertical shaft 70, and a locking piece 73 fixed on an intermediate part of a link 72, as shown in FIGS. 8, 9, and 14. A sloping surface 71a which is pushed by the hook 58 is formed at the tip end of the stopper 71, and a hook 71b for engaging with and locking a projection 73a of the locking piece 73 is formed at the lower part of the stopper 71. The stopper 71 is urged to rotate clockwise in FIG. 14 by a torsion coil spring 74, that is, in a direction such that the hook 71b engages and locks the projection 73a.

Figure 13:
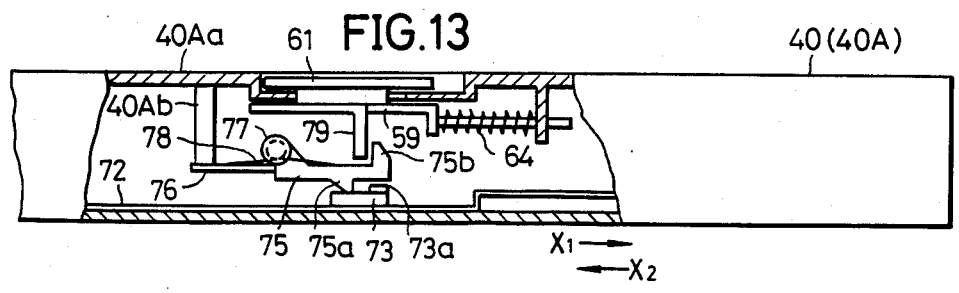

In FIGS. 12 and 13, a lock lever 75 is a lever for locking the sliding knob 61. This lock lever 75 is arranged above the locking piece 73, and one end thereof is supported by a horizontal shaft 77 of a bracket 76. The lock lever 75 is urged to rotate clockwise by a torsion coil spring 78. The bracket 76 is fixed to the lower end of a hanging pole 40Ab which hangs downwardly from the top plate 40Aa of the adapter 40A. In addition, a projection 75a which is locked by the locking piece 73, is formed on the lower surface of the lock lever 75 at an intermediate part thereof. A hook 75b for engaging and locking a hanging piece 79 of the sliding member 59, is formed on the upper surface of the lock lever 75 at the tip end thereof.

Before a tape loading operation is carried out, the lock lever 75 is in the position rotated clockwise as shown in FIG. 12. Thus, the hook 75b is positioned below the hanging piece 79, and the sliding knob 61 can be manipulated to slide in the direction of the arrow X1.

Figure 15:
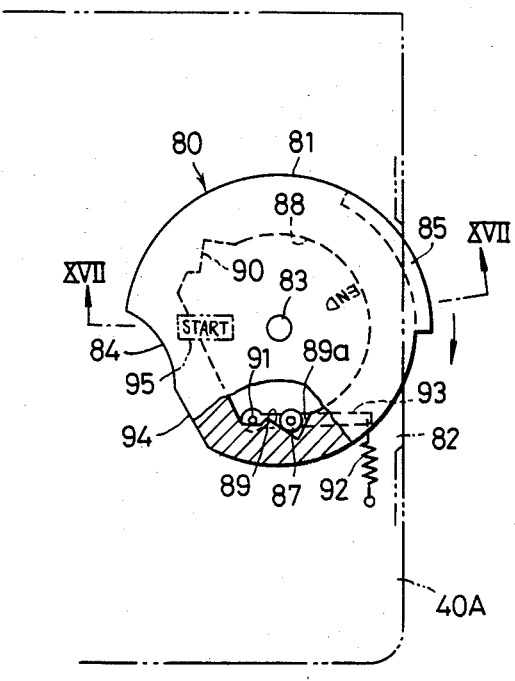
FIGS. 15 and 16 are plan views, with a part cut away, showing a manipulation knob mechanism in a state before a tape loading operation is started and a state after manipulation of the adapter is completed, respectively.
Figure 16:
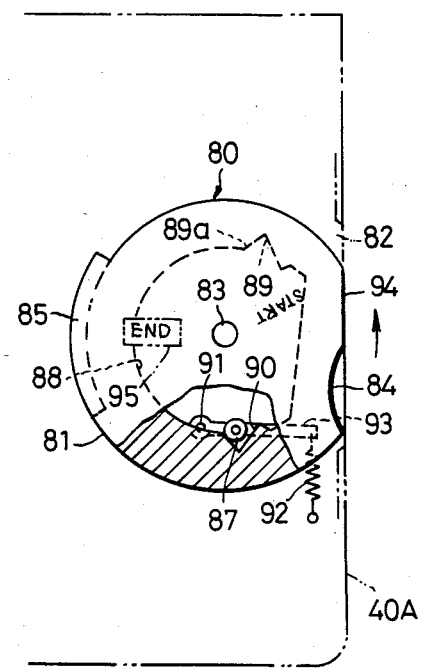

As shown in FIGS. 15 and 16, the manipulation knob 80 is arranged so that an arcuate manipulation part 81 projects from a window 82 in the right side of the adapter case 40A. The manipulation knob 80 rotates about a shaft 83.

Figure 17:
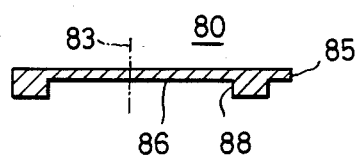
FIG. 17 is a view in cross section showing the shape of a manipulation knob along a line XVII—XVII in FIG. 15.

A depressed part 84 is provided on the counterclockwise side of the arcuate manipulation part 81. A thin flange part 85 is provided on the clockwise side of the arcuate manipulation part 81, as shown in FIG. 17. The depressed part 84 and the thin flange part 85 lets the operator know that the tape loading or tape unloading operation is about to be completed, by providing change in touch when the operator manipulates the manipulation knob 80 by his finger tips.

The manipulation knob 80 comprises a depression 86 in the bottom thereof, and the inner peripheral wall of the depresion 86 is formed as a cam surface 88 with which a roller 87 makes contact. V-shaped grooves 89 and 90 are formed on both ends of an arcuate portion of the cam surface 88. The roller 87 is supported on a lever 93 by a pin. This lever 93 is pivotally supported by a pin 91 on one end thereof, and is urged to rotate clockwise by a spring 92 having one end fixed and the other end connected to the other end of the lever 93. The manipulation knob 80 is locked with a click with the roller 87 fitted within the V-shaped groove 89 as shown in FIG. 15, before starting of a tape loading operation or after completion of a tape unloading operation. After the tape loading operation is completed, the manipulation knob 80 is similarly locked with a click with the roller 87 fitted within the V-shaped groove 90 as shown in FIG. 16. Especially upon completion of the tape loading operation, the depressed part 84 and a flat part 94 become aligned within the window 82, and in this state, the manipulation part 81 does not project from the right side of the adapter case 40A.

The size of the V-shaped groove 89 is large compared to the diameter of the roller 87, so that the roller 87 can slip out of the V-shaped groove 89 when the manipulation knob 80 is rotated by a relatively large angle from the position shown in FIG. 15. Accordingly, in a state where the tape loading operation has progressed slightly, the roller 87 still pushes against a sloping surface 89a of the V-shaped groove 89. If the operator lets go of his finger tips from the manipulation part 81 at this stage, the manipulation knob 80 will not remain in that rotational position but will rotationally return to its original position due to the action of the roller 87. Hence, the tape loading mechanism which started to operate and has undergone slight movement, will also return to its original state. In addition, when the tape unloading operation is carried out to a state near its completion, the roller 87 will partly enter within the V-shaped groove 89. In this state, even if the operator lets manipulation knob 80 will automatically rotate to the position where the tape unloading is completed, due to the action of the roller 87. Thus, the tape loading mechanism will positively assume the state where the tape unloading has been completed.

The mechanism (the lock lever 75 and the locking piece 73) for locking the sliding knob 61, is designed to operate the tape loading operation has progressed slightly, by considering the error introduced upon assembly and the like. In accordance with this design, a measure is taken against a case where the sliding knob locking mechanism with respect to the sliding knob 61 has not operated although the manipulation knob 80 is being manipulated. That is, the roller 87 is set so that, in an initial stage of the tape loading operation where the manipulation knob 80 is only rotated slightly (the sliding knob locking mechanism does not start operating and is in a state incapable of locking the sliding knob 61 in this state), the roller does not slip out of the V-shaped groove 89 and still makes contact with the sloping surface of the V-shaped groove 89. Hence, if the operator lets go of his finger tips from the manipulation knob 80 in the stage before the sliding knob locking mechanism starts to operate, the manipulation knob 80 and the tape loading mechanism which has undergone slight movement both automatically return to their original states. Accordingly, the tape cassette 10 will always be removed from the accommodating part 41 in a state where the tape loading mechanism is returned to its original state. The tape cassette 10 is thus prevented from being removed from the accommodating part 41 in a state where the tape loading mechanism has undergone slight movement, and as a result, the tape is prevented from being accidentally damaged.

Indications "START" and "END" are provided at predetermined positions on the upper surface of the manipulation knob 80. The indication "START" becomes exposed and visible through a window 95 before the tape loading operation is started and after the tape unloading operation is completed, to indicate that the adapter 40 is in a state before the tape loading operation is started or in a state where the tape unloading operation has been completed. The other indication "END" becomes exposed and visible through the window 95 upon completion of the tape loading operation, to indicate that the adapter 40 is in a state where the tape loading operation has been completed.

Figure 18:
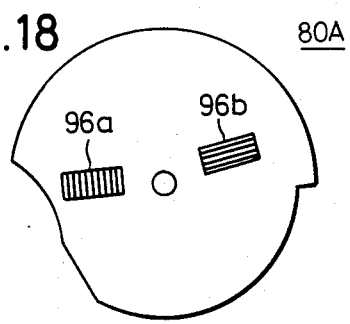
FIG. 18 is a plan view showing a modification of a manipulation knob.

FIG. 18 shows a modification of the manipulation knob. In this modification, a red label 96a is adhered onto a manipulation knob 80A instead of the above indication "START", and a blue label 96b is adhered onto the manipulation knob 80A instead of the indication "END". According to this manipulation knob 80A, the red label 96a becomes exposed and visible through the window 95 before the tape loading operation is started (when the tape unloading operation is completed), that is, the color visible through the window 95 is red. As the tape loading operation is started, the color visible through the window 95 becomes black which is the color of the manipulation knob 80A, and the blue label 96b becomes exposed and visible through the window 95 when the tape loading operation is completed, that is, the color visible through the widow 95 becomes blue. The operator can easily detect the operation state of the adapter 40 by detecting the color visible through the window 95.

Instructions, cautions, trademark, and the like are printed on an indication panel 97. This indication panel 97 is mounted onto the adapter case 40A so as to close an opening 98 in the top plate 40Aa above the manipulation knob 80, and forms a part of the top plate 40Aa. The above described window 95 is formed in this indication panel 97.

The indication panel 97 is mounted onto the adapter case 40A during a finishing process of the adapter assembling process. Thus, the assembling of the adapter can be carried out efficiently by use of the opening 98.

Several kinds of indication panels are prepared according to the region where the adapter is to be used. The assembling process of the adapter 40 is the same regardless of the region where the adapter is to be used, and the indication panel 97 which is in accordance with the region where the adapter is to be used is mounted in a finishing or final process to complete the adapter 40.

Next, description will be given with respect to the operation in which the tape cassette 10 is accommodated within the accommodating part 41 of the adapter 40, to form the predetermined tape path within the adapter 40.

When accommodating the tape cassette 10 within the adapter 40, the sliding knob 61 is slid in the direction of the arrow X1 to release the locking of the locking finger 60 with respect to the hook 58. Thus, the cover 45 covering the top of the accommodating part 41 of the adapter 40 rotates upwardly as shown in FIGS. 9 and 10 due to the action of the spring 57.

Figure 10:
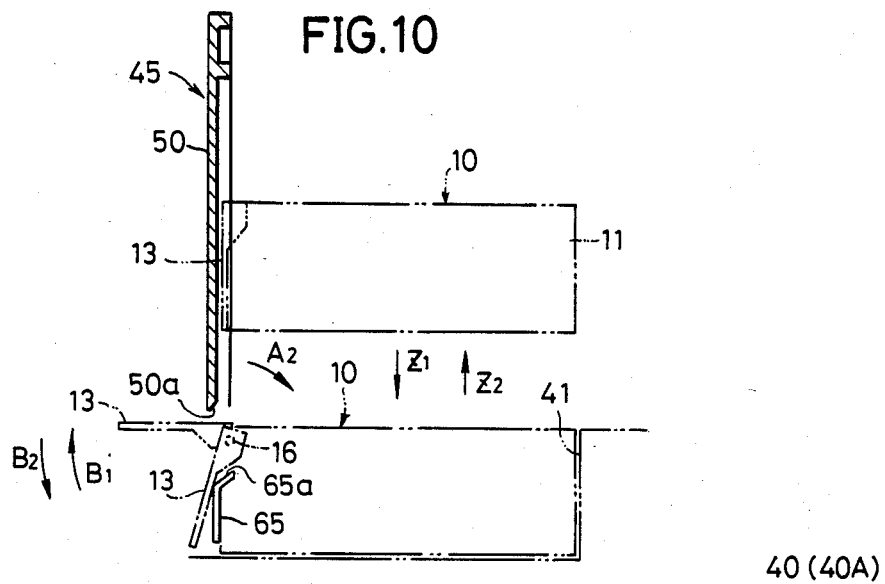
FIG. 10 is a side view showing a state where the front lid of the miniature type tape cassette is opened as the tape cassette is accommodated within the adapter and the top cover is closed.

The tape cassette 10 is accommodated within the accommodating part 41, in a state where the lid 13 of the tape cassette 10 is closed as shown in FIG. 10, by pushing down the tape cassette 10 into the accommodating part 41 of the adapter 40 in the direction of an arrow Z1. The tape cassette 10 is accommodated facing a predetermined direction, by fitting grooves provided on the side of the tape cassette over corresponding projecting ribs provided at the accommodating part 41. By the above operation to accommodate the tape cassette 10 within the adapter 40, the poles 46 and 47 are respectively and relatively inserted into the cutouts 29 and 30 of the tape cassette 10 on the inner side of the tape path 12A, so as to oppose the tape path 12A. Moreover, a gear teeth 25a meshes with the gear 44. After the tape cassette 10 is accommodated within the accommodating part 41, the cover 45 covering the top of the accommodating part 41 is closed so as to cover the top of the accommodated cassette case 11.

In a state where the tape cassette 10 is merely accommodated within the accommodating part 41 and the cover 45 remains open, the stopper 71 is not locked by the hook 58 and is rotated clockwise, and the hook 71b locks the projection 73a, as shown in FIGS. 9 and 14. Accordingly, the link 72 is locked and is restricted from moving in the direction of the arrow X1, and it is impossible to rotationally manipulate the manipulation knob 80 in this state. Therefore, it is possible to prevent an erroneous operation in which the the tape loading operation is carried out by rotationally manipulating the manipulation knob 80 in the state where the cover 45 is open, from being carried out.

When the cover 45 is closed, the sloping surface 71a is pushed by the hook 58 and the stopper 71 rotates counterclockwise as shown in FIG. 8. Thus, the hook 71b disengages from the projection 73a, to release the locking with respect to the link 72. As a result, the tape loading operation can be carried out in this state.

In addition, as the tape cassette 10 is being accommodated within the accommodating part 41, the lower right and left edges of the lid 13 are guided by the sloping surfaces 66a and 65a of the lid locking parts 66 and 65 of the open cover 45. Thus, the lid 13 rotates slightly in the direction of an arrow B1. When the tape cassette 10 becomes completely accommodated within the accommodating part 41, the lid 13 is slightly open as indicated by a one-dot chain line in FIGS. 9 and 10. That is, the lid 13 projects beyond the lid locking parts 65 and 66, and the back surface of the lid 13 makes contact with the lid locking parts 65 and 66. When the cover 45 is then rotated in the direction of the arrow A2 so as to close, the right and left ends of the lid 13 are held the lid locking parts 66 and 65 which are rotating in the direction of the arrow B1, and the lid 13 is further rotated in the direction of the arrow B1. The lid 13 assumes its open or horizontal state with a click as it rotates, when the cover 45 is closed halfway.

When the cover 45 is closed, the upper surface of the cassette case 11 is covered by the closed cover 45, and the lid 13 is in its open state lying on the same plane as the upper surface of the arms 51 and 52, as shown in FIGS. 6 through 8. The lid 13 is held open by the lid locking parts 66 and 65 which respectively make contact with the back surface at the right and left ends of the lid 13, and the lid 13 will not close even if a force acts on the lid 13 to close. Accordingly, the lid 13 will not close even when the lid 13 is pushed erroneously. Further, the adapter 40 can also be used with a front loading type recording and/or reproducing apparatus without introducing any problems, although the lid 13 will be pushed by rollers of a front loading mechanism in such an apparatus.

When the knob 80 is rotationally manipulated clockwise in the above state, a special chain 100 comprising three interconnected links moves along a J-shaped guide groove 101a of a guide plate 101. The loading arm 49 is pulled by the chain 100 and rotates clockwise about a shaft 102 up to a position shown in FIG. 3. This rotation of the loading arm 49 is transmitted to the loading arm 48 by way of the link 72, a fan-shaped gear 103, and a series of gear wheels 104. Accordingly, the loading arm 48 is rotated counterclockwise about a shaft 105 up to a position shown in FIG. 3.

By the rotation of the loading arms 48 and 49, the poles 46 and 47 intercept and engage with the tape 12 to draw the tape 12 out of the tape cassette 10. These poles 46 and 47 reach positions shown in FIG. 3 whereat the operation of drawing out the tape 12 is completed. The tape 12 is drawn out from the reels 20 and 21 of the tape cassette 10 within the adapter case 40A, to form a predetermined tape path 12B, guided by the poles 46 and 47, as shown in FIG. 3. The tape path 12B which is formed by the guidance provided by the poles 46 and 47 is identical to the tape path formed at the front of the standard type tape cassette.

In this state, the adapter 40 may be loaded into a standard type recording and/or reproducing apparatus (not shown) as in the case of a standard type tape cassette.

When the manipulation knob 80 is manipulated as described before and the link 72 moves substantially in the direction of the arrow X1, the locking piece 73 makes contact with the projection 75a and pushes the projection 75a upwards as shown in FIG. 13. Thus, the lock lever 75 rotates counterclockwise against the force exerted by the spring 78, and the hook 75b moves upwardly to lock the hanging piece 79. Accordingly, even when an attempt is made to slide the sliding knob 61 in the direction of the arrow X1, the hanging piece 79 is locked by the hook 75b and the sliding knob 61 will not slide. That is, the sliding of the sliding knob 61 is blocked by the hook 75b, so that the sliding knob 61 will not slide. Hence, the sliding knob 61 will not slide after the tape loading operation is started, and the locking by the locking finger 60 with respect to the hook 58 cannot be released. This means that the cover 45 cannot be opened after the tape loading operation is started.

Accordingly, it is possible to positively prevent an erroneous handling of the adapter 40 after the tape loading operation is started, such as an erroneous removal of the accommodated tape cassette 10 from the accommodating part 41 by opening the cover 45. As a result, the magnetic tape is protected and will not be damaged by such an erroneous handling of the adapter 40.

When removing the tape cassette 10 from the accommodating part 41 of the adapter 40, the manipulation knob 80 is rotated counterclockwise to its original position.

By rotating the manipulation knob 80 in this manner, the loading arms 48 and 49 respectively rotate clockwise and counterclockwise up to the positions shown in FIG. 2. Moreover, the poles 46 and 47 respectively return into the cutouts 29 and 30 of the tape cassette 10 which is accommodated within the accommodating part 41.

In addition, by the above rotation of the manipulation knob 80, the rotation of a gear which rotates unitarily with the manipulation knob 80 is transmitted to the take-up reel 21 within the tape cassette 10 through a series of gears 106 and the reel driving gear 44. As a result, the take-up reel 21 rotates clockwise, and the tape 12 which was drawn outside the tape cassette 10 is taken up by the take-up reel 21. Hence, the entire tape 12 drawn outside the tape cassette 10 is recovered into the tape cassette 10 to form the tape path 12A.

A one-way clutch (not shown) is provided at an intermediate position in the series of gears 106. The clutch operates so that the gears of the series of gears 106 mesh with each other to transmit the rotation of the manipulation knob 80 during the tape unloading operation described before, and so that the gears slip and will not transmit the rotation of the manipulation knob 80 during the tape loading operation.

Turning now to the operation of the lock lever 75 during the tape unloading operation, the lock lever 75 is pushed upwards by the locking piece 73 to lock the hanging piece 79 as shown in FIG. 13. Moreover, the sliding knob 61 is maintained in its locked state so that the sliding knob 61 will not slide, that is, so that the cover 45 will not open. Accordingly, the tape cassette 10 is positively prevented from being erroneously removed from the accommodating part 41 of the adapter 40 in a stage where the tape unloading operation is being carried out and the tape unloading has not been completed. Therefore, the magnetic tape is prevented from being damaged by such an erroneous removal of the tape cassette 10 before the tape unloading operation has been completed.

When the tape unloading operation is completed, the locking piece 73 moves together with the link 72 in the direction of the arrow X2 and returns to its original position. Further, the lock lever 75 is rotated clockwise by the action of the spring 78 as shown in FIG. 12, and the hook 75b disengages from hanging piece 79. In this state, the sliding knob 61 is released from its locked state, and can slide when manipulated.

When removing the tape cassette 10 from the accommodating part 41 of the adapter 40, the sliding knob 61 is slid after completion of the tape unloading operation. As the sliding knob 61 slides, the cover 45 opens as shown in FIG. 10. The tape cassette 10 moves in the direction of an arrow Z2 when the operator inserts his finger through the inserting hole 43 to push the bottom of the tape cassette 10 upwards, and the tape cassette 10 can thus be removed from the adapter 40.

As the tape cassette 10 is being removed from the adapter 40, the open lid 13 makes contact with a front edge 50a of the main body 50 of the cover 45 as the tape cassette 10 moves upwardly. Hence, the lid 13 is relatively pushed downwardly by the front edge 50a and the lid 13 is caused to close during the removal of the tape cassette 10 from the adapter 40. As shown in FIGS. 6, 7, and 10, the front edge 50a is formed as a sloping surface. In addition, the tip end of the front edge 50a makes contact with the lid 13 at a position on the lid 13 which is separated from the pin 16. Thus, a relatively large momentum acts on the lid 13 in a direction so as to close the lid 13. As a result, the lid 13 is closed smoothly as the tape cassette 10 is removed from the adapter 40.

FIGS. 21 and 22 show an essential part of another embodiment of an adapter according to the present invention. An adapter 110 is designed similarly as the adapter 40 shown in FIG. 2 and the like, except for a lever 111. In FIGS. 21 and 22, those parts which are the same as those corresponding parts in FIG. 2 are designated by the same reference numerals, and their description will be omitted.

The lever 111 detects that the tape cassette 10 is accommodated within the accommodating part 41 of the adapter 110. The lever 111 is pivotally supported by a pin 112, and is urged to rotate counterclockwise. One end 111a of the lever 111 projects within the accommodating part 41 through an opening 114a in a side wall 114 which forms the accommodating part 41 as shown in FIG. 22, to detect the accommodated tape cassette 10. Another end 111b the lever 111 engages with a cutout 72a of the link 72. Accordingly, when the tape cassette 10 is not accommodated within the accommodating part 41 of the adapter 110 and the accommodating part 41 is empty, the link 72 is locked by the lever 111. Thus, in this state, the manipulation knob 80 cannot be rotated even if the operator erroneously attempts to rotate the manipulation knob 80, and the poles 46 and 47 cannot move to carry out the tape loading operation.

Accordingly, when the accommodating part 41 of the adapter 110 is empty, the tape loading mechanism is always in the unloading state shown in FIG. 2. If the tape cassette 10 is accommodated within the accommodating part 41 in the state where the tape loading mechanism is carrying out or has completed the tape loading operation, the poles 46 and 47 will be positioned on the outer side of the tape path 12A. Thus, the poles 46 and 47 will not intercept the tape 12 as they move, and the tape path 12B will not be formed. Moreover, the poles 46 and 47 which return to their unloading positions will hit the tape 12 and accordingly damage the tape 12. However, according to the above adapter 110, the tape cassette 10 is always accommodated within the accommodating part 41 when the tape loading mechanism is in its unloading state. Therefore, the above accident in which the tape 12 will become damaged will not happen in the adapter 110.

When the tape cassette 10 is inserted into the accommodating part 41 of the adapter 110, the cassette case 11 pushes a sloping surface 111a-1 of the arm 111a which is projecting within the accommodating part 41. Hence, the lever 111 rotates clockwise against the force exerted by the spring 113 as indicated by a two-dot chain line in FIG. 21, and the arm 111b disengages from the cutout 72a. Accordingly, the link 72 is released from its locked state, and it becomes possible to rotate the manipulation knob 80 in this state. When the manipulation knob 80 is rotated, the tape loading operation is carried out within the adapter 110 as in the case of the adapter 40 describe before.

Further, the present invention is not limited to these embodiments, but various variations and modifications may be made without departing from the scope of the present invention.

What is claimed is:

1. An adapter for a miniature type tape cassette having an external form and size smaller than those of a standard type tape cassette, said miniature type tape cassette being used with a recording and/or reproducing apparatus of a type different from a standard type recording and/or reproducing apparatus primarily designed for carrying out recording and/or reproduction with said standard type tape cassette, said adapter comprising:

an adapter case having an external form and size substantially identical to those of said standard type tape cassette;

an accommodating part for accommodating said miniature type tape cassette;

a cover for covering said accommodating part in its closed state, said cover being provided in a state free to open and close;

tape draw-out means provided within said adapter case, for drawing out a tape from said miniature type tape cassette accommodated within said accommodating part and forming a predetermined tape path within said adapter case; and locking means for engaging with a part of said tape draw-out means when said cover is in its open state, and for locking said tape draw-out means in an immovable state at a position before said tape draw-out means starts a tape draw-out operation, said locking means being displaced by one part of said cover and being disengaged from said part of said tape draw-out means when said cover is closed to release the locking with respect to said tape draw-out means.

2. An adapter as claimed in claim 1 in which said locking means comprises a rotary locking member, and urging means for urging said rotary locking member in a direction so as to engage with said part of said tape draw-out means, said rotary locking member being urged by a force exerted by said urging means when said cover is in its open state to assume a rotary position for locking said tape draw-out means, and being rotated against the force exerted by said urging means by said one part of said cover when said cover is closed to disengage from said part of said tape draw-out means.

3. An adapter as claimed in claim 1 which further comprises a cover locking mechanism for locking said cover in the closed state in its locking state and for allowing said cover to open when released from its locking state, and a preventing mechanism for preventing said cover locking mechanism from being released from its locking state in relation to a tape draw-out operation of said tape draw-out means.

4. An adapter as claimed in claim 3 in which said cover locking mechanism comprises a first locking part provided on said cover and a second locking part for locking said first locking part, said second locking part being slid to release its locking with respect to said first locking part, and said preventing mechanism comprises a blocking member displaced according to the operation of said tape draw-out means, for blocking said second locking part from being slid, said blocking member assuming a position where it does not block said second locking part from sliding when said tape draw-out means is at a position before a tape draw-out operation is started.

5. An adapter as claimed in claim 1 which further comprises a preventing member for preventing said tape draw-out means from being displaced from a position before a tape draw-out operation is started when the tape cassette is not accommodated within said accommodating part, said preventing member having one part projecting within said accommodating part, and another part which engages with a part of said tape draw-out means when the tape cassette is not accommodated within said accommodating part so as to prevent said tape draw-out means from being displaced from the position before a tape draw-out operation is started, said one part of said preventing member being pushed and displaced by the tape cassette when the tape cassette is accommodated within said accommodating part and releasing the preventing operation with respect to said tape draw-out means.

6. An adapter as claimed in claim 1 in which said tape draw-out means comprises a rotary manipulation knob, a first rotary lever for intercepting and drawing out the tape within said tape cassette in response to a manipulation of said rotary manipulation knob, a displaceable lever for transmitting rotational displacement of said first rotary lever, and a second rotary lever rotated in response to transmission of rotational displacement by said displaceable lever, for intercepting and drawing out the tape within said tape cassette, said part of said tape draw-out means being an intermediate part of said displaceable lever.

* * * * *